United States Patent
Kawashima et al.

(10) Patent No.: US 6,248,412 B1
(45) Date of Patent: Jun. 19, 2001

(54) LUSTER RESIN MOLDINGS AND METHOD OF MANUFACTURING THE SAME

(75) Inventors: Daiichiro Kawashima, Ichinomiya; Hiromi Hyuga, Aichi; Hiroshi Mukai, Hashima; Koichi Ogiso, Gifu, all of (JP)

(73) Assignee: Toyoda Gosei Co., Ltd., Aaichi (JP)

( * ) Notice: Subject to any disclaimer, the term of this patent is extended or adjusted under 35 U.S.C. 154(b) by 0 days.

(21) Appl. No.: 09/310,338

(22) Filed: May 12, 1999

(30) Foreign Application Priority Data

May 12, 1998 (JP) .................................. 10-128656

(51) Int. Cl.[7] .................................................. B60R 13/00
(52) U.S. Cl. ........................... 428/31; 428/119; 428/120; 428/134; 428/137; 264/1.1; 264/45.1; 264/328.1; 264/241; 293/102; 293/120
(58) Field of Search .............................. 428/31, 134, 137, 428/119, 120; 264/1.1, 241, 328.1, 45.1; 293/155, 102, 120

(56) References Cited

U.S. PATENT DOCUMENTS

| | | | |
|---|---|---|---|
| 4,220,681 | * | 9/1980 | Narita ..................................... 428/31 |
| 4,298,640 | * | 11/1981 | Katoh ..................................... 428/31 |
| 4,305,981 | * | 12/1981 | Muroi et al. ........................... 428/31 |
| 4,332,412 | * | 6/1982 | Nakazawa et al. ..................... 296/29 |
| 4,536,937 | * | 8/1985 | Nagasaka ............................... 29/460 |
| 4,613,937 | * | 9/1986 | Fujita ..................................... 293/128 |

* cited by examiner

Primary Examiner—Deborah Jones
Assistant Examiner—Abraham Bahta
(74) Attorney, Agent, or Firm—Pillsbury Winthrop LLP

(57) ABSTRACT

A method of manufacturing a luster resin molding such as an automobile side molding or the like is disclosed. The luster resin molding has a molding body formed of luster synthetic resin and is elongated in a specific direction, and a positioning boss is formed integrally with the back surface of the molding body and erected substantially perpendicularly to the back surface of the molding body. A slide core for molding the positioning boss is moved to mold the positioning boss integrally with the molding body after synthetic resin injected in the longitudinal direction of the molding body has passed through a boss position where the positioning boss will be formed.

5 Claims, 4 Drawing Sheets

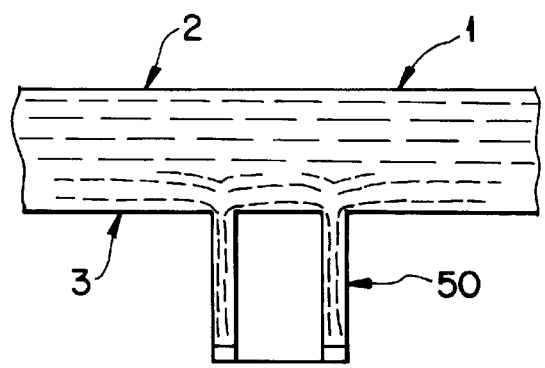
FIG. IA
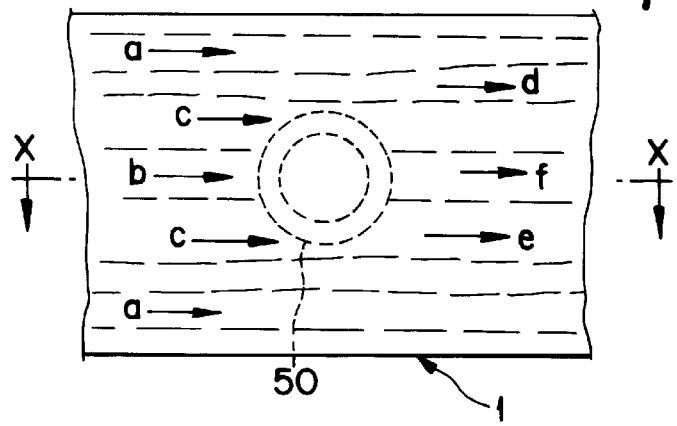
FIG. IB
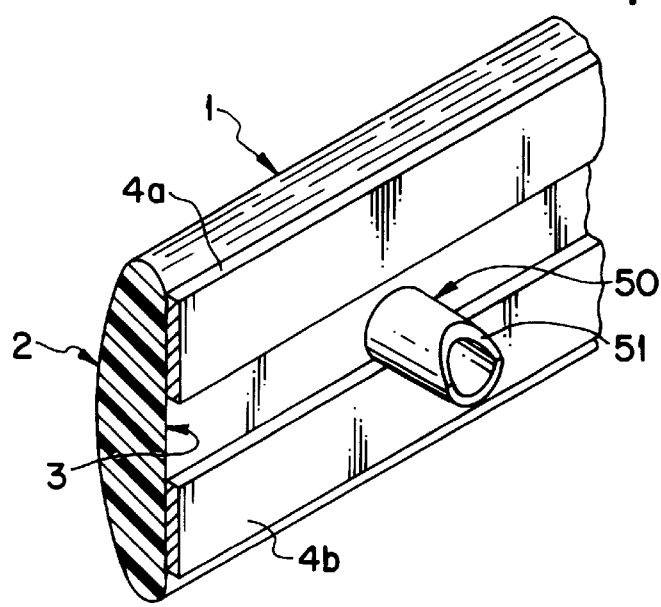
FIG. 2

LUSTER RESIN MOLDINGS AND METHOD OF MANUFACTURING THE SAME

BACKGROUND OF THE INVENTION

1. Field of the Invention

The present invention relates to a luster resin molding, for example, a long resin molding having metallic luster or the like obtained by mixing metallic pigment, and a method of manufacturing such a molding. Particularly, such a molding can be used as an automobile side molding formed of luster resin and such a method can be used as a method of manufacturing such an automobile side molding.

The present application is based on Japanese Patent Application No. Hei. 10-128656, which is incorporated herein by reference.

2. Description of the Related Art

As for an automobile molding as such a conventional luster resin molding, a technique shown in FIG. 5 is known.

FIG. 5 is a sectional view of a conventional automobile molding taken perpendicularly to its longitudinal direction.

In the conventional automobile molding, a design surface 2 is provided on the front surface of a molding body 1 while a car-body attachment surface 3 is formed on the back surface. Two lines of double-side adhesive tapes 4a and 4b are pasted to the car-body attachment surface 3. A cross-shaped positioning boss 5 is provided between the double-side adhesive tapes 4a and 4b so as to project from the molding body 1. The positioning boss 5 is formed integrally with the back surface of the molding body 1.

The automobile molding is attached to a car body 7 in such a manner as follows. The positioning boss 5 is inserted into a positioning hole 8 of the car body 7. Pressure is applied to the molding body 1 in the state where the molding body 1 has been positioned onto the car body 7. The molding body 1 is fixed to the car body 7 by the adhesive force of the double-side adhesive tapes 4a and 4b. In the conventional automobile molding, therefore, since the positioning boss 5 is provided so as to project from the molding body 1, the molding body 1 can be attached to an accurate position of the car body 7 by the positioning boss 5.

Another technique disclosed in Japanese Utility Model Publication No. Sho. 62-95960 is also known as an automobile molding having such a positioning boss.

If the molding body 1 and the positioning boss 5 were formed integrally, however, the following problem was caused. The problem will be described about a case where the cross-shaped positioning boss 5 is formed integrally with the molding body 1 by way of example.

FIGS. 6A and 6B are explanatory views showing a relationship between the injection direction and distribution of metallic pigment when the positioning boss is formed integrally with the molding body 1. FIG. 6A is a front view in which the longitudinal direction extends right and left, and FIG. 6B is a top plan view in which the longitudinal direction extends right and left.

The flow of synthetic resin in the molding body 1 is affected by the flow of resin into the cross-shaped positioning boss 5A, so that the light distribution of metallic pigment near the cross-shaped positioning boss 5A to the molding body 1 is as follows.

As shown in FIG. 6A, the flow velocity of a boss supply flow n near the central line X—X before flowing into the cross-shaped positioning boss 5A does not change in comparison with that of a main flow m supplied by injection molding. However, the flow velocity of the boss supply flow n after flowing into the cross-shaped positioning boss 5A becomes slower than the main flow m supplied by injection molding because the flow in the longitudinal direction of the molding body 1 is affected by the volume of the positioning boss 5A. As a result, a flow-in phenomenon occurs in the downstream of the cross-shaped positioning boss 5A so as to compensate the main flow n supplied by injection molding. For example, in the downstream of the cross-shaped positioning boss 5A, the main flow n flows in the direction of the central line X—X of the cross-shaped positioning boss 5A. But, the flow velocity of the main flow n flowing in the direction of the central line X—X becomes slower than that on its opposite sides because of the volume supplied in the longitudinal direction of the cross-shaped positioning boss 5A, so that flow-in streams o and g is generated in the opposite sides. These flow-in streams o and g move round from the opposite sides of the positioning boss 5A, and then flow in the direction of the central line of the main flow n. The position where the flow-in streams o and g run against each other appears in the downstream of the cross-shaped positioning boss 5A.

Reduction of flow velocity caused by confluence of these flow-in streams o and g results in turbulence of distribution of synthetic resin blended with metallic pigment in the downstream of the cross-shaped positioning boss 5A. As a result, a black line p of a flow of synthetic resin appears in the downstream of the cross-shaped positioning boss 5A. Accordingly, the external appearance of the molding becomes bad.

SUMMARY OF THE INVENTION

It is therefore an object of the present invention to provide a luster resin molding and a manufacturing method thereof, in which the portion of the design surface corresponding to a positioning boss of a body can be continued to another portion of the design surface to result in good appearance.

According to the present invention, there is provided a luster resin molding comprising a body formed of luster resin; a substantially cylindrical boss formed on a back surface of the body integrally therewith so as to erect in a direction substantially perpendicular to the back surface of the body; and a notched end portion provided on an opposite side of the boss to the body so as to have an end face inclined with respect to the direction of erection.

Further, according to the present invention, a method of manufacturing a luster resin molding is provided, which comprises the steps of: providing a first core having a first cavity for molding a body of the luster resin molding and a second cavity for molding a boss to be formed on a back surface of the body integrally therewith so as to erect in a direction substantially perpendicular to the back surface of the body; providing a second core in the second cavity of the first core at a first position, the second core being movable in the second cavity; injecting luster resin into the first cavity; and moving the second core from the first position to a second position after the injected luster resin has passed through a position in which the boss is to be molded.

Features and advantages of the invention will be evident from the following detailed description of the preferred embodiments described in conjunction with the attached drawings.

BRIEF DESCRIPTION OF THE DRAWINGS

In the accompanying drawings:

FIGS. 1A and 1B are explanatory views showing a relationship the injection direction and distribution of metallic pigment when a positioning boss is formed integrally with a molding body as luster resin molding according to an embodiment of the present invention, FIG. 1A is a front view in the state where the longitudinal direction extends right and left, and FIG. 1B is a top plan view in the state where the longitudinal direction extends right and left;

FIG. 2 is a perspective view showing the molding body and the positioning boss constituting a luster resin molding according to the embodiment of the present invention;

FIG. 6A is a front view in the state where the longitudinal direction extends right and left, and FIG. 6B is a top plan view in the state where the longitudinal direction extends right and left.

DETAILED DESCRIPTION OF THE PREFERRED EMBODIMENTS

An embodiment of the present invention will be described below.

In the embodiment, the parts the same as or equivalent to those in the conventional art are referenced correspondingly.

Figure 3A:
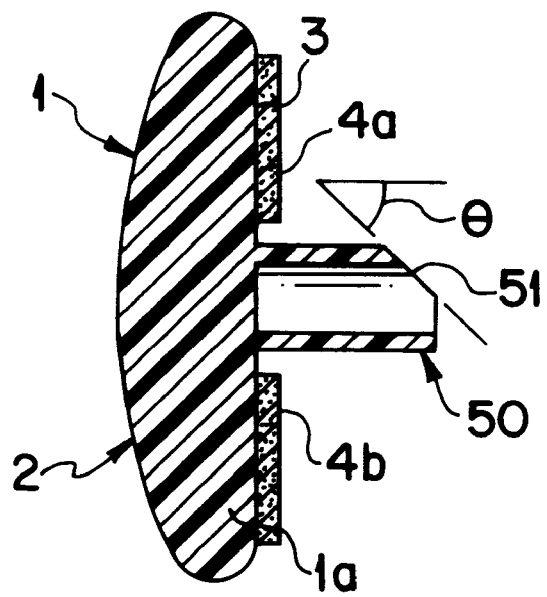
FIGS. 3A ad 3B are sectional views showing the molding body and the positioning boss constituting a luster resin molding according to the embodiment of the present invention.
Figure 3B:
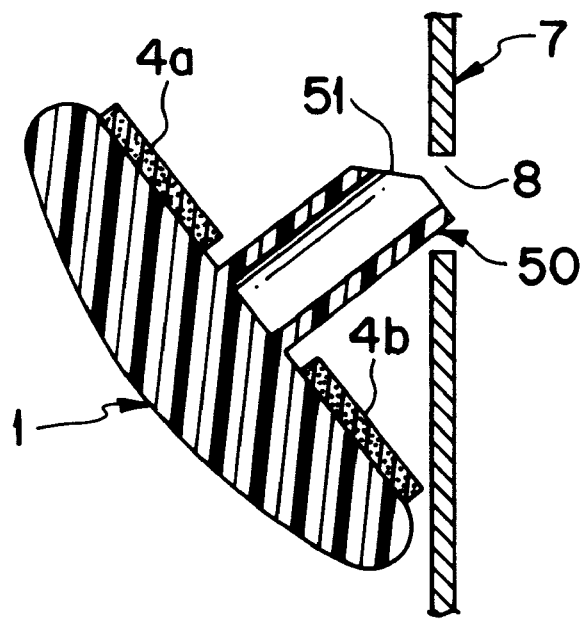

FIGS. 1A and 1B are explanatory views showing a relationship between the injection direction and distribution of metallic pigment when a positioning boss is formed integrally with a molding body as luster resin molding according to the embodiment of the present invention. FIG. 1A is a front view in which the longitudinal direction extends right and left, and FIG. 1B is a top plan view in which the longitudinal direction extends right and left. In addition, FIG. 2 is a perspective view showing a molding body and a positioning boss constituting a luster resin molding according to the embodiment of the present invention. FIGS. 3A and 3B are sectional views showing the molding body and the positioning boss of the luster resin molding according to the embodiment of the present invention. FIG. 3A is an explanatory view showing a relationship between the molding body and the positioning boss; and FIG. 3B is an explanatory view showing a relationship among a fitting hole of a car body, the molding body and the positioning boss.

Referring to FIGS. 1A and 1B, description will be made about a phenomenon that the distribution of metallic pigment near a substantially cylindrical positioning boss 50 to a molding body 1 is affected by the resin flowing into the substantially cylindrical positioning boss 50.

First, the flow velocity of a boss supply flow b flowing toward the center of the substantially cylindrical positioning boss 50 near the central line X—X of the molding body 1 does not change in comparison with that of a main flow a supplied by injection molding until the boss supply flow b flows into the positioning boss 50. However, the flow velocity of the boss supply flow b flowing into the substantially cylindrical positioning boss 50 becomes slower than the main flow a supplied by injection molding because a flow in the longitudinal direction of the molding body 1 is affected by the volume of the positioning boss 50 near the central line X—X. The volume (sectional area) varies gradually with going away from the central line X—X of the substantially cylindrical positioning boss 50, and the volume (sectional area along the flowing direction) increases with going outward. The flow of injected synthetic resin supplied from the center (central line X—X) of the substantially cylindrical positioning boss 50 begins to go round in the circumferential direction of the substantially cylindrical positioning boss 50. Thus, the synthetic resin is supplied in the direction apart from the center of the positioning boss 50. Accordingly, the injected synthetic resin is supplied to the positioning boss 50 without causing any sudden change of flow.

Near the outer circumference of the positioning boss 50, a deficiency of synthetic resin is supplied to the synthetic resin flow supplied from the central line X—X side. However, the deficiency is so slight that the flow is affected only by the thickness of the substantially cylindrical positioning boss 50 viewed from the car-body attachment surface 3 side. That is, the direction of an outer-circumferential supply flow c supplied by injection molding near the outer circumference of the substantially cylindrical positioning boss 50 apart from the boss supply flow b flowing into the substantially cylindrical positioning boss 50 changes because of a slight thickness of the positioning boss 50 of the molding body 1. The outer-circumferential supply flow c has no influence to another flow, for example, a flow on the design surface 2 side.

In addition, since the main flow a, the boss supply flow b and the outer-circumferential supply flow c supplied by injection molding and passed through the positioning boss 50 do not change specifically, a flow f in the central portion and flows d and e on the opposite sides become parallel with one another.

Therefore, though the main flow a and the boss supply flow b supplied by injection molding produce flowing into the substantially cylindrical positioning boss 50, the influence is slight. In addition, in the downstream of the substantially cylindrical positioning boss 50, the flow f in the central portion and the flows d and e on the opposite sides, which have passed through the positioning boss 50, become parallel with one another, so that no flow flowing into the central line from the opposite sides is produced. Accordingly, no position where flows run against each other is caused. As a result, a black line is prevented from appearing in the downstream of the substantially cylindrical positioning boss 50, so that good appearance of the molding body 1 can be obtained. That is, no turbulence of distribution of synthetic resin blended with metallic pigment appears in the downstream of the substantially cylindrical positioning boss 50, so that good appearance can be obtained.

In addition, there is provided a cut end portion 51 formed as if an end portion of the positioning boss 50 opposite to the molding body 1 is cut so as to be inclined at an angle θ of about 45 degrees with respect to the erect direction of the positioning boss 50 and in parallel with the longitudinal direction. This cut end portion 51 is provided for making it easy to position and insert the positioning boss 50 when the positioning boss 50 is inserted into a positioning hole 8 of a car body or the like. In accordance with necessity, that may be done by tapering the substantially cylindrical shape of the positioning boss 50.

In the case where such a cut end portion 51 is provided in the end portion of the positioning boss 50 opposite to the molding body 1 by cutting the end portion of the positioning boss 50 in parallel with the longitudinal direction of the molding body 1 so as to be inclined at an angle θ of about 45 degrees or from about 20 to 60 degrees with respect to the erect direction of the positioning boss 50, it is possible to confirm the state where the positioning boss 50 is inserted into the positioning hole 8 of the car body 7, and it is possible to obtain a natural connection state because the positioning boss 50 does not move right and left during insertion into the positioning hole 8.

In the luster resin molding in this embodiment, a well-known automobile side molding was used as the molding body 1, and the cut end portion 51 was formed in the end portion of the positioning boss 50 so that the cut end portion 51 had a length of 15 mm, an outer diameter of 7 mm, a thickness of 0.75 mm, and an inclined surface of 45 degrees, while 3 mm from the outer circumference toward the center was left as it is. In this embodiment, it was possible to obtain a luster resin molding having good appearance in which the portion of the design surface 2 of the molding body 1 corresponding to the positioning boss 50 could be made continuous to the rest portions of the design surface 2.

Next, a specific configuration of a luster resin molding as an automobile side molding according to this embodiment will be described.

As shown in FIGS. 2 and 3, a molding body 1 in this embodiment is molded by extruding synthetic resin material such as polyvinyl chloride (PVC) or the like into a long shape, and provided with a design surface 2 having a sectionally arcuate shape on the front surface, and with a flat car-body attachment surface 3 on the back surface. Double-side adhesive tapes 4a and 4b for attaching the molding body 1 to a car body 7 are pasted to the car-body attachment surface 3 while peeling sheets (not shown) on their one sides are separated from the double-side adhesive tapes 4a and 4b respectively.

In the widthwise central portion of the car-body attachment surface 3, a plurality of positioning bosses 50 (only one of them is illustrated) are provided at intervals in the longitudinal direction of the molding body 1 so as to project from the molding body 1. Two lines of double-side adhesive tapes 4a and 4b are pasted so as to extend in the longitudinal direction of the molding body 1 and so as to sandwich the positioning boss 50. That is, these double-side adhesive tapes 4a and 4b are arranged in two lines above and under the positioning bosses 50 respectively.

When the automobile molding manufacturing thus is attached to the car body 7, peeling sheets of the double-side adhesive tapes 4a and 4b are separated respectively, and cut end portions 51 of the positioning bosses 50 are inserted into positioning holes 8 of the car body 7 for positioning the molding body 1, so that the molding body 1 is positioned in a predetermined position of the car body 7. Positioned in this state, the molding body 1 is pressed onto the car body 7 so as to be bonded therewith. Then, the molding body 1 is attached to the car body 7 straight and firmly by the double-side adhesive tapes 4a and 4b.

In such a manner, the luster resin molding in this embodiment is provided with the molding body 1 formed of luster synthetic resin and elongated in a specific direction, and the cylindrical positioning boss 50 formed integrally with the back surface of the molding body 1 so as to erect substantially perpendicularly to the molding body 1. The cylindrical positioning boss 50 has the cut end portion 51 formed at the free end portion of the positioning boss 50 so as to be inclined with respect to the erect direction.

Therefore, synthetic resin supplied by injection molding flows to the outer circumferential portion of the substantially cylindrical positioning boss 50. However, this influences slightly on the flow in the design surface 2 side of the molding body 1. In addition, in the downstream of the substantially cylindrical positioning boss 50, the flow in the central portion and the flows on the opposite sides thereof which have passed through the positioning boss 50 become parallel with one another, so that there are no position where the flows run against each other. As a result, a black line p is prevented from appearing in the downstream of the substantially cylindrical positioning boss 50 to thereby provide good appearance. That is, no turbulence of distribution of synthetic resin blended with metallic pigment appears in the downstream of the substantially cylindrical positioning boss 50 to thereby provide good appearance.

In addition, the end portion of the positioning boss 50 opposite to the molding body 1 is formed as the cut end portion 51 inclined at a predetermined angle with respect to the erect direction of the positioning boss 50. Therefore, the cut end portion 51 makes it easy to insert the positioning boss 50 into a positioning hole 8 of a car body or the like. In addition, there is no fear that the molding body 1 moves in its longitudinal direction from the start to the end of the insertion work. Accordingly, the molding body 1 can be bonded with the car body without displacement when the molding body 1 is bonded by the double-side adhesive tape 4a and 4b or bonding agent.

Although the embodiment of the luster resin molding has been described about the case where the molding body 1 is used as an automobile side molding, the present invention is applicable to any luster resin molding so long as it requires a positioning boss 50 and has a design surface in the opposite side.

In addition, although the embodiment of the luster resin molding has been described about the case where the positioning boss 50 erected substantially perpendicularly to the molding body 1 is shaped to be substantially cylindrical, any polygon having three or more sides can be also used if the external appearance of the design surface 2 is not pursued so much.

The cut end portion 51 formed at the end portion of the positioning boss 50 opposite to the molding body 1 has an end surface inclined at an angle of about 45 degrees with respect to the erect direction of the positioning boss 50. However, when the present invention is carried out, it is possible to set the inclination angle desirably in accordance with the conditions of insertion.

Figure 4A:
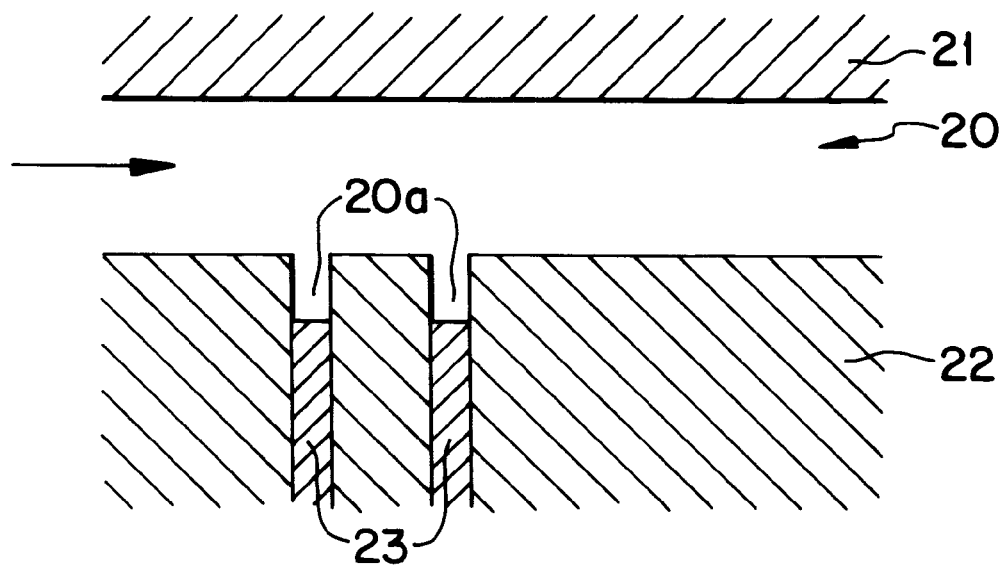
FIGS. 4A and 4B are explanatory view showing the process of a manufacturing method of the molding body and the positioning boss constituting a luster resin molding according to the embodiment of the present invention.
Figure 4B:
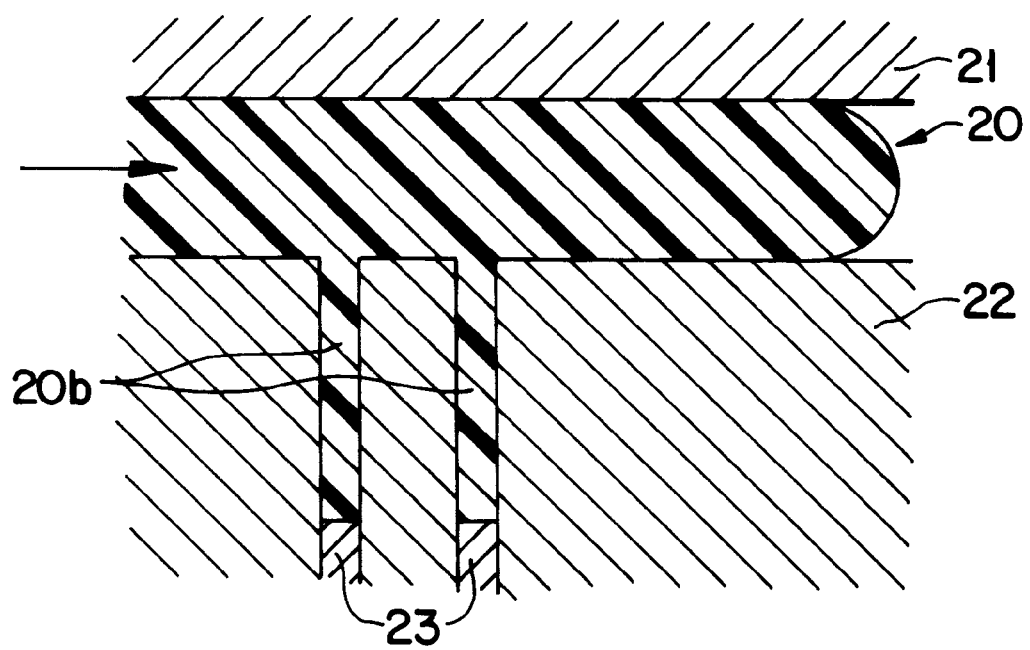
Figure 5:
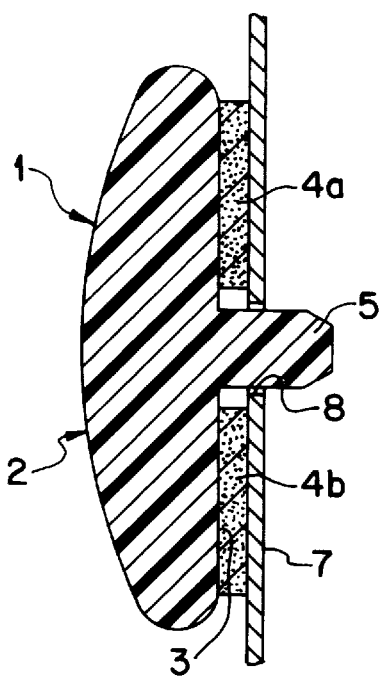
FIG. 5 is a sectional view showing a portion of a conventional automobile molding.
Figure 6A:
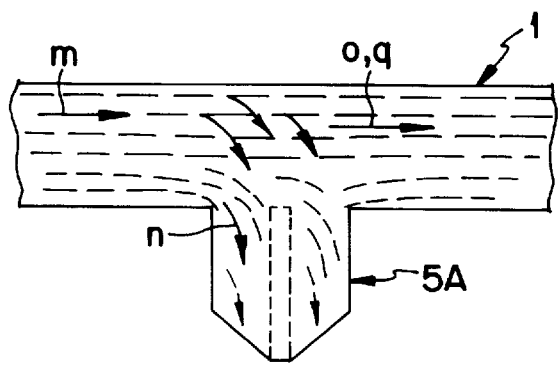
FIGS. 6A and 6B are explanatory views showing a relationship between the injection direction and light distribution of metallic pigment when a positioning boss is formed integrally with a background-art molding body.
Figure 6B:
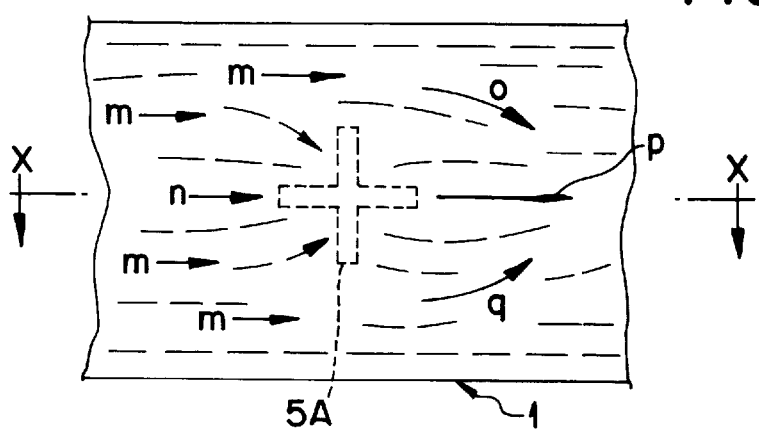

FIGS. 4A and 4B are explanatory views showing the process of a method of manufacturing a molding body and a positioning boss constituting a luster resin molding according to an embodiment of the present invention. FIG. 4A is an explanatory view showing a state of a mold before injection, and FIG. 4B is an explanatory view showing a state where a core is moved back after synthetic resin has passed through the position of the positioning boss by injection.

In FIGS. 4A and 4B, a body cavity 20 is formed by an upper mold 21 for forming the design surface 2 side of the molding body 1 and a lower mold 22 for forming the car-body attachment surface 3 side. On the other hand, the substantially cylindrical positioning boss 50 is formed by the change of a minimum boss cavity 20a into a maximum boss cavity 20b due to the movement of a slide core 23. At the beginning of injection molding, the slide core 23 is disposed to form the minimum boss cavity 20a. It is preferable to make the volume of this minimum boss cavity 20a as small as possible.

Here, as shown in FIG. 4A, synthetic resin is injected in the longitudinal direction of the body cavity 20 in a state where the body cavity 20 and the minimum boss cavity 20a have been formed. At this time, synthetic resin flowing into the substantially cylindrical minimum boss cavity 20a is so slight that the flow velocity of the synthetic resin is little changed by the minimum boss cavity 20a. Accordingly, there appears no turbulence in distribution of metallic pigment on the design surface 2 side of the molding body 1 formed by the body cavity 20.

Then, as shown in FIG. 4B, after synthetic resin injected in the longitudinal direction of the molding body 1 has passed through the position corresponding to the positioning boss 50, the slide core 23 is moved back from the position of the minimum boss cavity 20a to the position of the maximum boss cavity 20b particularly in the state where the molding body 1 formed in the body cavity 20 begins to be cooled on its design surface 2 side. At this time, a volume difference between the volume in the position of the minimum boss cavity 20a and the volume in the position of the maximum boss cavity 20b is produced by the movement of the slide core 23. The synthetic resin is supplied from the body cavity 20 side by this volume difference, but the supply of the synthetic resin does not cause any turbulence in distribution on the design surface 2 side because the molding body 1 formed in the body cavity 20 has begun to be cooled on the design surface 2 side.

Therefore, synthetic resin supplied by injection molding flows into the maximum boss cavity 20b. It is however possible to avoid the influence on the distribution of metallic pigment on the design surface 2 side due to the flowing-in. As a result, a black line is prevented from appearing in the downstream of the substantially cylindrical positioning boss 50, so that a good appearance can be obtained. That is, no turbulence of distribution of synthetic resin blended with metallic pigment appears in the downstream of the substantially cylindrical positioning boss 50, so that good appearance can be obtained.

In the case where a plurality of substantially cylindrical positioning bosses 50 are provided, it will go well if a plurality of slide cores 23 are moved back sequentially after synthetic resin injected in the longitudinal direction of the molding body 1 have passed through positions corresponding to the positioning bosses 50. Alternatively, in accordance with the injection speed, a plurality of slide cores 23 may be moved back sequentially simultaneously with or immediately before injection to the molding body 1 is completed.

Although description has been made about the case where, according to such a manufacturing method, the positioning boss 50 formed by moving the slide core 23 back from the position of the minimum boss cavity 20a to the position of the maximum boss cavity 20b is shaped to be substantially cylindrical, the present inventors have confirmed that the shape of the positioning boss 50 is not limited specifically when the present invention is carried out.

As has been described above, in the method of manufacturing a luster resin molding according to this embodiment, that is, in such as an automobile side molding or the like comprising a molding body 1 formed of luster synthetic resin and elongated in a specific direction and a positioning boss 50 formed integrally with the back surface of the molding body 1 and erected substantially perpendicularly to the back surface of the molding body 1, a slide core 23 for molding the positioning boss 50 is moved to mold the positioning boss 50 integrally with the molding body 1 after synthetic resin injected in the longitudinal direction of the molding body 1 has passed through a boss position where the positioning boss 50 will be formed.

Thus, synthetic resin supplied by injection molding forms the molding body 1 before the slide core 23 forms the volume of the positioning boss 50, and then the slide core 23 is moved back to form the positioning boss 50 when a design surface 2 of the molding body 1 has been cooled to begin to be solidified. Accordingly, it is possible to avoid the influence on distribution of pigment on the design surface 2 side of the molding body 1. As a result, a black line is prevented from appearing in the downstream of the positioning boss 50, so that good appearance can be obtained. That is, no turbulence of distribution of synthetic resin blended with metallic pigment appears in the downstream of the substantially cylindrical positioning boss 50, so that good appearance can be obtained.

Although description has been made about the molding body 1 of an automobile side molding in the method for manufacturing a luster resin molding in this embodiment, the present invention is applicable to any molding body so long as it requires a positioning boss 50 and has a design surface on the opposite side to the positioning boss 50.

In addition, in the method of manufacturing a luster resin molding in this embodiment, the slide core 23 for molding the positioning boss 50 is moved to mold the positioning boss 50 integrally with the molding body 1 after synthetic resin injected in the longitudinal direction of the molding body 1 has passed through a boss position where the positioning boss 50 will be formed. In the case where the present invention is carried out so that a plurality of gates are provided, however, the cores such as the slide cores 23 or the like for molding positioning bosses 50 may be moved after synthetic resin for molding the molding body 1 has passed through positions where the positioning bosses 50 will be formed.

As described above, a luster resin molding according to the present invention comprises a body formed of luster synthetic resin and elongated in a specific direction, and a substantially cylindrical boss formed integrally with the back surface of the body and erected substantially vertically on the back surface of the body, the boss being provided with a cut end surface portion formed on the opposite side to the body so as to be inclined relatively to the erect direction.

Therefore, synthetic resin supplied by injection molding flows into the outer circumferential portion of the substantially cylindrical positioning boss, but the flow gives slight influence to the design surface side of the molding body. In addition, in the downstream of the substantially cylindrical positioning boss, a flow in the central portion and flows on the opposite sides thereof which have passed through the positioning boss become parallel with one another, so that there appears no position where the flows run against each other. As a result, a black line is prevented from appearing in the downstream of the substantially cylindrical positioning boss, so that good appearance can be obtained. Therefore, no turbulence of distribution of synthetic resin blended with metallic pigment appears on the design surface, so that good appearance can be obtained.

In a method of manufacturing a luster resin molding having a body formed of luster synthetic resin and elongated in a specific direction, and a boss formed integrally with the back surface of the body and erected substantially vertically on the back surface of the body, a core for molding the boss is moved to mold the boss integrally with the body after synthetic resin injected in the longitudinal direction of the body has passed through the position of the boss.

Therefore, synthetic resin supplied by injection molding forms the body before the core forms the volume of the positioning boss, and then the core is moved to form the positioning boss when a design surface of the body has been cooled to begin to be solidified. Accordingly, it is possible to avoid the influence on distribution of pigment on the design surface side of the body. As a result, a black line is prevented from appearing in the downstream of the positioning boss, so that good appearance can be obtained. Therefore, no turbulence of distribution of synthetic resin blended with metallic pigment appears in the downstream of the positioning boss, so that good appearance can be obtained.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A luster resin molding comprising:

a body formed of luster resin containing metallic pigment;

a substantially cylindrical boss, having a first end and a second end, is formed on a back surface of said body integrally therewith so as said boss extends perpendicularly from said back surface, wherein said first end of said boss attaches to said back surface of said body;

a notched end portion provided on said second end of said boss so as to have a singular inclined end face inclined with respect to the perpendicular direction of said boss; and wherein said notched end portion is provided to permit the distribution of said metallic pigment in a segment of said body above the boss to flow substantially the same as the distribution of said metallic pigment in other segments of said body.

2. A luster resin molding according to claim 1, wherein a sectional shape of said boss is circular.

3. A luster resin molding according to claim 1, wherein said notched end portion is inclined from 20 to 60 degrees with respect to the perpendicular direction of said boss.

4. A method of manufacturing a luster resin molding according to claim 1, comprising:

providing a first core having a first cavity for molding said body of the luster resin molding and a second cavity for molding said boss to be formed on said back surface of said body;

providing a second core in said second cavity of said first core at a first position, said second core being movable in said second cavity;

injecting luster resin into said first cavity; and moving the second core from said first position to a second position after the injected luster resin passes through a position in which said boss is to be molded.

5. A method of manufacturing a luster resin molding according to claim 4, wherein said second core is moved after a part of the injected luster resin begins to cool.

* * * * *